Aug. 26, 1930.　　　A. DAVIS, JR　　　1,774,086
TRUCK TANK
Filed Nov. 3, 1928
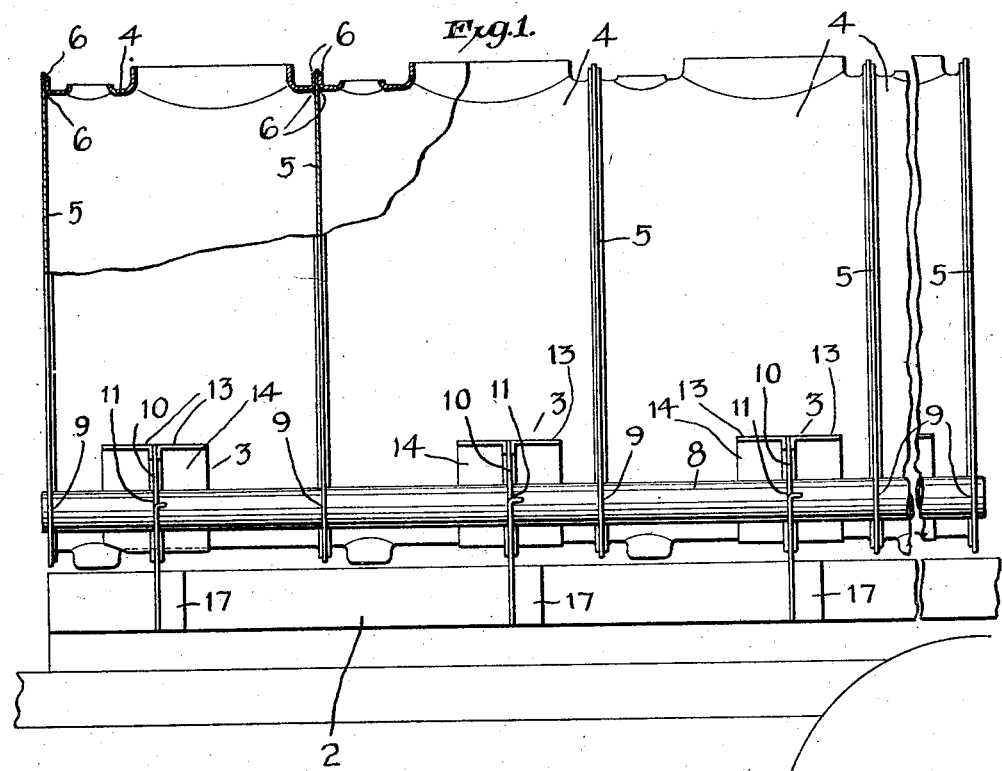
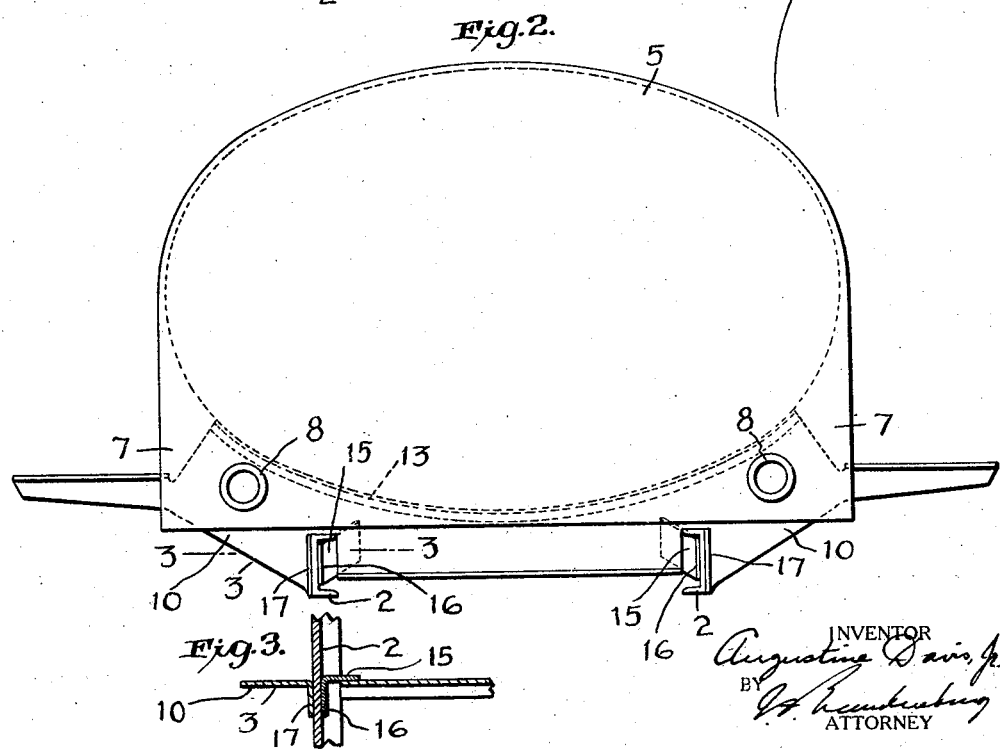
INVENTOR
Augustine Davis, Jr.
BY
ATTORNEY Patented Aug. 26, 1930

1,774,086

UNITED STATES PATENT OFFICE

AUGUSTINE DAVIS, JR., OF CINCINNATI, OHIO

TRUCK TANK

Application filed November 3, 1928. Serial No. 317,057.

It is known to brace welded multiple compartment truck tanks for transporting gasoline and the like by means of the delivery pipes, by welding them to bolsters which are formed integrally with end and partition sheets forming the heads of the compartments. A disadvantage of that plan is that the bolster supports for the tank are in the plane of the welds between the head sheets and the shells of the tank, causing these liquid-retaining welds to be subject to serious strains, which are the more severe because of the fact that the bolsters are parts of the heads.

The object of the present invention is to overcome this difficulty, and to secure a construction which is otherwise much stronger and sturdier to resist the stresses to which these motor vehicle tanks are subjected. Instead of bolsters integral with the head sheets, I provide separate bolsters in which the tank is cradled on wide surfaces spaced from the welds, and form the head sheets with freely depending extensions which are tied together by longitudinal members. The fact that these extensions are not carrying or supporting members relieves the welds of strain and avoids a possible cause of failure in such tanks. The tie members are preferably welded to both the head extensions and the separate bolsters, the latter, in turn, being welded or intimately secured to channel sills, so that there is a double, repeated, trussed connection between the tank heads and the mounting or under frame.

Other features of the invention will become apparent.

In the accompanying drawings, forming part hereof;

Fig. 1 is a side elevation of a compartmented truck tank and its mounting embodying the invention, a portion being shown in broken section, and an intermediate part of the tank being broken out;

Fig. 2 is an end view; and

Fig. 3 is a detail section taken on the line 3—3 of Fig. 2.

The mounting for the tank is shown as comprising a pair of longitudinal channel irons 2, constituting sill members. Welded to these members are a number of cradle bolsters 3.

The tank itself is composed of a number of shells 4, together with end and partition sheets 5 constituting the heads of as many compartments as are desired. The shells and head sheets are united by welds, indicated at 6.

The head sheets 5 are extended downward for a distance, the width of the extensions 7 being, preferably, as great as the width of the tank. These extensions are free of the sills 2, or, in other words, are excluded from the vertical load-supporting system.

A pair of stout longitudinal tie members, preferably in the form of heavy tubes 8, pass through openings in the several extensions 7, and are welded to the extensions at 9. They also pass through openings in the webs 10 of the bolsters 3, to which they are also preferably welded at 11.

Each bolster comprises the web 10 having its upper edge incurved in general conformity to the curvature of the under part of the tank, and two curved pieces 13 welded to opposite sides of the upper portion of the web, these pieces being angular in cross-section, with wide lateral flanges 14, the two of which provide a broad cradle surface for the support of the tank. The tank rests by its shells in these cradles, and the regions of support are spaced from, or at least not in the vertical plane of, the heads 5, and not integral therewith.

The web 10 of each bolster is recessed from the under side at two laterally spaced regions to receive the sills 2. Flanges 17 bent from the webs at the outer edges of the recesses are welded to the outer sides of the sills. At the inner sides of the channels, plates 15 are welded to the webs; and flanges 16 bent from these plates are welded to the inner faces of the channels.

The tie members 8 are spaced far apart, being located outboard of the sills, practically beneath the outer lateral lines of the tank. Thus, a very wide and strong trussed beam is secured, which very effectually strengthens the tank against strains which may be thrown into the side of the tank by a wreck or otherwise.

Very great strength results from the uniting of the tie members to both the head extensions 7 and the separate bolsters 3, the latter of which are united to the sills 2. The fact that the transverse supports are removed from the tank welds is a matter of prime importance for preserving the integrity of these welds.

I claim:

1. A construction of the character described, comprising a multiple compartment truck tank formed of head sheets and shells united by welds, full supporting means for said tank comprising bolsters in which the tank is cradled at regions removed from said welds, said sheets having freely depending extensions, and longitudinal tie members united to said extensions.

2. A construction of the character described, comprising a multiple compartment truck tank formed of head sheets and shells united by welds, supporting means comprising longitudinal sills and transverse bolsters united to said sills, the tank being cradled in said bolsters at regions removed from said welds, said sheets having freely depending extensions, and longitudinal tie members passing through said bolsters and extensions and united to both.

3. A construction of the character described, comprising a multiple compartment truck tank formed of head sheets and shells united by welds, full supporting means for said tank comprising longitudinal channel sills and transverse bolsters wherein the tank is cradled at regions removed from said welds, said bolsters comprising each a web welded to said sills and curved pieces of angular section welded to said web and affording a broad cradle surface, said sheets having freely depending extensions, and longitudinal tie members passing through and united to said extensions.

4. A construction of the character described, comprising a multiple compartment truck tank formed of head sheets and shells united by welds, supporting means comprising longitudinal channel sills and transverse bolsters wherein the tank is cradled at regions removed from said welds, said bolsters comprising each a web welded to said sills and curved pieces of angular section welded to said web and affording a broad cradle surface, said sheets having freely depending extensions, and longitudinal tie members passing through and united to said extensions, said tie members lying outside of the sills and close to the vertical planes of the side lines of the tank.

AUGUSTINE DAVIS, Jr.